(12) United States Patent
Barrett et al.

(10) Patent No.: US 7,088,778 B2
(45) Date of Patent: Aug. 8, 2006

(54) METHOD AND APPARATUS FOR MEASUREMENT OF CHANNEL TRANSMISSION ACCURACY

(75) Inventors: Paul Alexander Barrett, Ispwich (GB); Antony William Rix, Cambridge (GB); Phil Gray, Ipswich (GB)

(73) Assignee: Psytechnics Limited, Ipswich (GB)

( * ) Notice: Subject to any disclaimer, the term of this patent is extended or adjusted under 35 U.S.C. 154(b) by 749 days.

(21) Appl. No.: 10/237,562

(22) Filed: Sep. 9, 2002

(65) Prior Publication Data

US 2003/0068982 A1  Apr. 10, 2003

(30) Foreign Application Priority Data

Sep. 11, 2001 (EP) ................................. 01307738

(51) Int. Cl.
H04B 14/04 (2006.01)
G01R 31/28 (2006.01)
(52) U.S. Cl. ..................... 375/242; 381/94.1; 714/715
(58) Field of Classification Search ................ 375/144, 375/219, 222, 224, 242, 254, 259, 262, 265, 375/285; 381/94.1, 94.8; 455/63.1, 67.11, 455/67.13; 714/715
See application file for complete search history.

(56) References Cited

U.S. PATENT DOCUMENTS 5,802,105 A   9/1998 Tiedemann, Jr. et al.
5,841,873 A * 11/1998 Lockhart et al. ............ 713/181
6,157,830 A   12/2000 Minde et al.
6,493,398 B1 * 12/2002 Erisman ...................... 375/295
6,785,262 B1 *  8/2004 Yao et al. .................... 370/352
6,928,592 B1 *  8/2005 Barrett ........................ 714/715
2003/0035473 A1 *  2/2003 Takinosawa ................. 375/224
2004/0019844 A1 *  1/2004 Goodnow et al. ........... 714/798

FOREIGN PATENT DOCUMENTS

DE  43 24 292 C1  2/1995
EP  0 647 375 B1  4/1995
WO  01/93470 A1  12/2001

OTHER PUBLICATIONS

Balachandran K et al, "GPRS-136: High-Rate Packet Data Service for North American TDMA Digital Cellular Systems," IEEE Communications Society, US, vol. 6, No. 3, Jun. 1999, pp. 34-47, XP000831519, ISSN: 1070-9916.

* cited by examiner

Primary Examiner—Young T. Tse
(74) Attorney, Agent, or Firm—Burr & Brown

(57) ABSTRACT

The present invention relates to a method and apparatus for determining channel degradation information in which a known data sequence is compared to a transmitted version of the known data sequence to provide such information. To assess performance of a public land mobile network, it is convenient if assessment apparatus is located in the network rather than in a mobile station. The invention provides a technique for efficiently sending data characterizing channel degradation caused by the network to mobile station communication channel from the mobile station back to the network, where the channel degradation information is reconstructed.

11 Claims, 6 Drawing Sheets

METHOD AND APPARATUS FOR MEASUREMENT OF CHANNEL TRANSMISSION ACCURACY

BACKGROUND OF THE INVENTION

The present invention relates to a method and apparatus for determining channel degradation information in which a known data sequence is compared to a transmitted version of the known data sequence to provide such information.

Signals carried over telecommunications links can undergo considerable transformations, such as digitisation, encryption and modulation. They can also be distorted due to the effects of lossy compression and transmission errors.

Objective processes for the purpose of measuring the quality of a signal are currently under development and are of application in equipment development, equipment testing, and evaluation of system performance.

A number of patents and applications relate to this field, for example, European Patent 0647375, granted on 14 Oct. 1998. In this invention two initially identical copies of a test signal are used. The first copy is transmitted over the communications system under test. The resulting signal, which may have been degraded, is compared with the reference copy to identify audible errors in the degraded signal. These audible errors are assessed to determine their perceptual significance—that is, errors that are considered significant by human listeners are given greater weight than those that are not considered so significant. In particular inaudible errors are perceptually irrelevant and need not be assessed.

The automated system provides an output comparable to subjective quality measures originally devised for use by human subjects. More specifically, it generates two values, $Y_{LE}$ and $Y_{LQ}$, equivalent to the "Mean Opinion Scores" (MOS) for "listening effort" and "listening quality", which would be given by a panel of human listeners when listening to the same signal. The use of an automated system allows for more consistent assessment than human assessors could achieve, and also allows the use of compressed and simplified test sequences, which give spurious results when used with human assessors because such sequences do not convey intelligible content.

In the patent specification referred to above, an auditory transform of each signal is taken, to emulate the response of the human auditory system (ear and brain) to sound. The degraded signal is then compared with the reference signal in the perceptual domain, in which the subjective quality that would be perceived by a listener using the network is determined from parameters extracted from the transforms.

Such automated systems require a known (reference) signal to be played through a distorting system (the communications network or other system under test) to derive a degraded signal, which is compared with an undistorted version of the reference signal. Such systems are known as "intrusive" measurement systems, because whilst the test is carried out the channel under test cannot, in general, carry live traffic.

The present invention has applications in, but is not limited to, measuring the signal degradation caused by transmission over a digital radio channel. European patent application EP 01306950.5 describes how the perceived transmission quality of a digital radio channel can be evaluated using channel degradation information in the form of error patterns to generate a reference and degraded signal pair for use with an intrusive measurement system. Error patterns store the difference between a reference digital sequence and a degraded version received after transmission over an error-prone channel. In patent application EP 01306950.5, a novel means of generating a known test sequence for the purposes of generating error patterns is presented.

When testing the performance of a public land mobile radio network (PLMN), it is desirable to locate the apparatus used to perform the signal quality measurement apparatus in the network rather than the mobile station. Network based apparatus can be utilized more efficiently than mobile station based apparatus, by dynamically allocating it to active channels. Apparatus located in a mobile station will only be utilized when the mobile station is active, which in most cases represents a small fraction of time. This requirement to perform the quality measurement in the network presents a problem when measuring the performance of the downlink (network to mobile station) channel, because the degraded digital sequence used to form an error pattern is received at the mobile station.

European Patent application No. 00304497.1 describes a method and apparatus for measuring the performance of a communications channel while in normal use by exploiting periods of spare capacity. The invention described therein can be implemented according to the arrangements described below. The inventors of said patent solve the problem of downlink measurement by making provision to send an error protected version of the degraded digital sequence received at the mobile station back to the network, where it can be compared with a copy of the original to produce an error pattern.

A problem with transmitting an error corrected version of the degraded digital sequence is that the forward error correction process increases the amount of data that must be sent. If the transmission of the degraded signal is to be robust over a wide range of radio conditions, a powerful forward error correction code must be used, causing a substantial increase in the amount of data to be sent. For example, a rate 1/6 convolutional code will increase the amount of data to be transmitted by more than a factor of six. In many systems this increase in data will exceed the capacity of the transmission channel, especially if transmission is limited to periods of spare capacity, and the fraction of time for which signal quality measurements can be reported will be reduced. There will also be a need for a large buffer in which to store the degraded data sequences awaiting transmission.

The present invention provides a means of generating channel degradation information on the network side of a digital transmission channel that is derived from the error performance of the downlink channel. The invention alleviates the problem of buffering and transmitting large amounts of data over the uplink channel by sending a statistical representation characterising the errors in the degraded data sequence. This information is used to generate a representation of the channel degradation information with characteristics similar to the channel degradation information generated directly from the degraded data sequence. The statistical representation can be represented in relatively few bits, and can therefore be protected by powerful forward error correction codes without exceeding the transmission capacity of the channel. If transmission is limited to periods of spare capacity, the smaller amount of information also reduces the memory requirements of the buffer.

In some PLMN systems, provision is made to characterise the error performance in one direction, and return this information over the reverse channel. An example of this technique is the RXQUAL value that is calculated in GSM receivers (see GSM 05.08). However, the present invention is distinct from RXQUAL type measurements, because errors are accurately identified by comparing the received sequence with a local copy of the original sequence; RXQUAL is based on an estimate of the error rate calculated over 480 ms, and has been shown in the literature to provide an unreliable predictor of speech quality (Radio link parameter based speech quality index-SQI Karlsson, A.; Heikkila, G.; Minde, T. B.; Nordlund, M.; Timus, B.; Wiren, N. and Electronics, Circuits and Systems, 1999. Proceedings of ICECS '99. The 6th IEEE International Conference on , Volume: 3, 1999 Page(s): 1569–1572 vol.3.)

SUMMARY OF THE INVENTION

According to a first aspect of the present invention there is provided a method of determining a representation of channel degradation information for a communication channel, comprising the steps of generating a known data sequence within a transmitter; transmitting a coded data sequence based on the known data sequence via said communication channel; receiving data received via the communication channel to provide a received data sequence at a receiver; generating said coded data sequence based on the known data sequence within the receiver; and comparing the coded data sequence generated within the receiver with the received data sequence to provide said channel degradation information; characterised in that the method further comprises the steps of generating a statistical representation of the channel degradation information; transmitting the statistical representation to a receiver; and generating said representation of the channel degradation information according to the statistical representation.

According to a second aspect of the invention there is also provided a method in which a test data sequence is degraded using channel degradation information obtained according to the first aspect of the invention, comprising the steps of encoding the test data sequence to produce an encoded data sequence; modifying the encoded data sequence according to said representation of the channel degradation information; decoding the modified data sequence to produce a decoded data sequence; and comparing the decoded data sequence to the test data sequence.

The statistical representation of the channel degradation information may conveniently comprise a representation of the number of differences detected in the comparing step for each corresponding pair of frames of the known data sequence and the received data sequence.

Groups of bits in an output frame of a signal encoder may be channel encoded with different levels of error protection. In this case the representation of the number of differences detected may advantageously comprise a plurality of representations each representation corresponding to the number of differences detected for a set of symbols within a frame, each symbol of the set being encoded at a similar level of error protection.

When the channel degradation information is generated by comparing the data sequences at the output of a channel encoder with the input of a channel decoder. The channel degradation information may include soft-decision values produced by a demodulator in addition to the value of each received symbol. Soft-decision values indicate the likelihood that a symbol has been received in error, and, when used in combination with a maximum likelihood decoding algorithm such as the Viterbi algorithm, can improve the performance of the channel decoder.

In this case it is advantageous if the statistical representation of the channel degradation information further comprises a representation of a set of statistical values each of which is derived from the probability that a symbol within the received data sequence has been decoded correctly.

Information may be transmitted for each statistical representation by selecting, from a stored set of histograms, for example, an entry which is the best match to the statistical representation, so that the generation of a representation of the channel degradation information comprises selecting a representation of the channel degradation information from a set of stored representations according to the statistical representation.

A computer readable medium carrying a computer program for implementing the method of the invention and a computer program for implementing the method of the invention are also provided.

According to a third aspect of the invention there is provided an apparatus for determining a representation of channel degradation information for a communications channel comprising a generator arranged to generate a known data sequence; a transmitter including a coder and being arranged to transmit a coded data sequence based on the known data sequence; a receiver being arranged to receive the transmitted coded data sequence; a generator arranged to generate the coded data sequence based on the known data sequence; and a comparator arranged to compare the coded data sequence based on the known data sequence with the transmitted coded data sequence to provide channel degradation information characterised in that the apparatus also comprises a generator arranged to generate a statistical representation of the channel degradation information; a transmitter arranged to transmit the statistical representation to a receiver (60); and a generator arranged to generate the representation of the channel degradation information in dependence upon said statistical representation.

According to a further aspect of the invention there is provided an apparatus for determining a representation of channel degradation information for the communication channel according the third aspect of the invention; an encoder arranged to encode a reference signal; an error insertion device arranged to modify the encoded reference signal according to the representation of channel degradation information; a decoder arranged to decode the modified signal; and a comparator arranged to compare the decoded signal and the reference signal.

In one embodiment, the encoder comprises a signal encoder and a channel encoder and the decoder comprises a signal decoder and a channel decoder.

BRIEF DESCRIPTION OF THE DRAWINGS

Embodiments of the invention will now be described with reference to the accompanying drawings, in which.

DETAILED DESCRIPTION

It will be appreciated that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable combination.

The present invention is applicable to digital systems using symbols with any number levels, for example ternary or quaternary symbols. However, for the purposes of clarity, the embodiments of the invention are described with reference to data sequences comprising binary data symbols, or bits.

Figure 1:
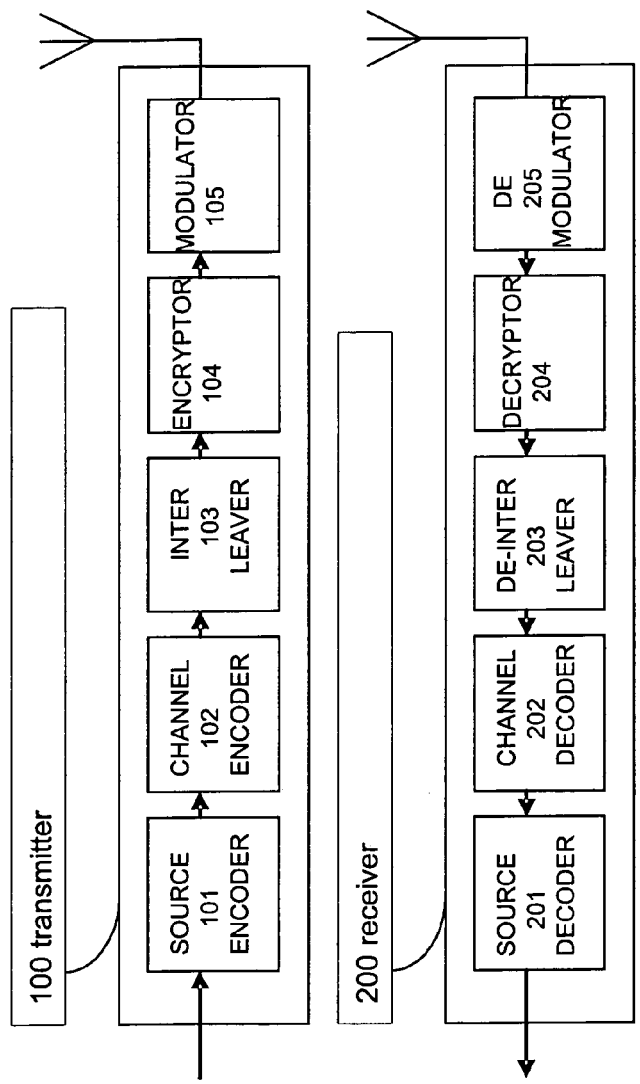
FIG. 1 is a block diagram illustrating a conventional transmitter and a receiver.
Figure 2:
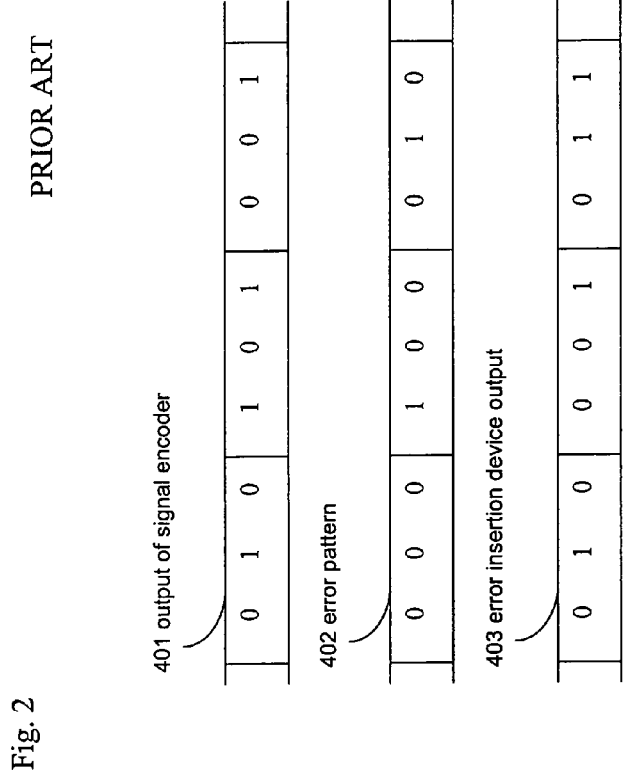
FIG. 2 illustrates the output of an error insertion device in response to a signal and an error pattern.

Before describing embodiments of the invention, known intrusive measurement systems will firstly be described with reference to FIG. 1 to FIG. 3. FIG. 1 illustrates a known communications system comprising a transmitter 100 and a receiver 200. A source encoder 101 encodes a signal into an encoded data sequence in order to reduce the data rate for a signal to be transmitted using appropriate compression techniques. The data is in the form of a sequence of symbols, which are binary digits (bits).

A channel encoder 102 further encodes the data sequence so that transmission errors can be detected and corrected by the receiver—a process that generally increases the data rate of the encoded sequence. An interleaver 103 reorders the symbols in the data sequence in a manner that improves the performance of the channel encoder 102, together with a channel decoder 202, in the presence of short radio fades (i.e. short bursts of errors). An encryptor 104 encrypts the data sequence to prevent decoding of the data sequence by third parties. Finally, the encrypted data sequence is converted into a radio signal by a modulator 105 and the radio signal is transmitted via a transmission channel to the receiver 200.

The received signal is converted into a data sequence by a demodulator 205, the data sequence is decrypted by the decryptor 204 and reordered by a de-interleaver 203. The channel decoder 202 corrects errors in the de-interleaved data sequence before passing it to a source decoder 201 along with information about errors that have been detected but not corrected. Finally, the source decoder 201 reconstructs a version of the original signal.

The signal at the output of the source decoder 201 will differ from the original signal at the input to the source encoder 101 if the source coding process is lossy or if the channel decoder is unable to detect or correct symbols received in error by the demodulator 205. Demodulation errors are generally caused by a poor signal-to-noise ratio on the radio channel, due to Raleigh fading, signal attenuation, or interference from other radio sources.

The source encoder 101, channel encoder 102, interleaver 103 and encryptor 104 operate independently of each other. Not all of the stages shown in FIG. 1 are included in every communication system.

The present invention is concerned with the generation of channel degradation information in the form of error patterns. The term 'raw' error pattern refers to a pattern constructed by comparing the data sequences at the output of the channel encoder and the input of the channel decoder. A raw error pattern may include soft-decision values produced by the demodulator 201 in addition to the value of each received symbol. Soft-decision values indicate the likelihood that a symbol has been received in error, and, when used in combination with a maximum likelihood decoding algorithm such as the Viterbi algorithm, can improve the performance of the channel decoder. Soft-decision values are often defined such that:

$$s = ln((1-p)/p)$$

where s is the soft-decision value and p is the probability of the symbol being received in error. Soft-decision error patterns are often used in the development of source and channel codecs, and typically include the soft-decision value of the received symbol with an indication of whether the symbol was received correctly or not. Such error patterns are typically produced using software simulations of the radio channel.

The term 'residual' error pattern refers to a pattern constructed by comparing the data sequences at the input of the channel encoder and the output of the channel decoder. Residual error patterns may include information about uncorrected but detected errors, often in the form of a binary bad frame indicator, which indicates an error in one or more of the most sensitive bit positions.

Figure 3:
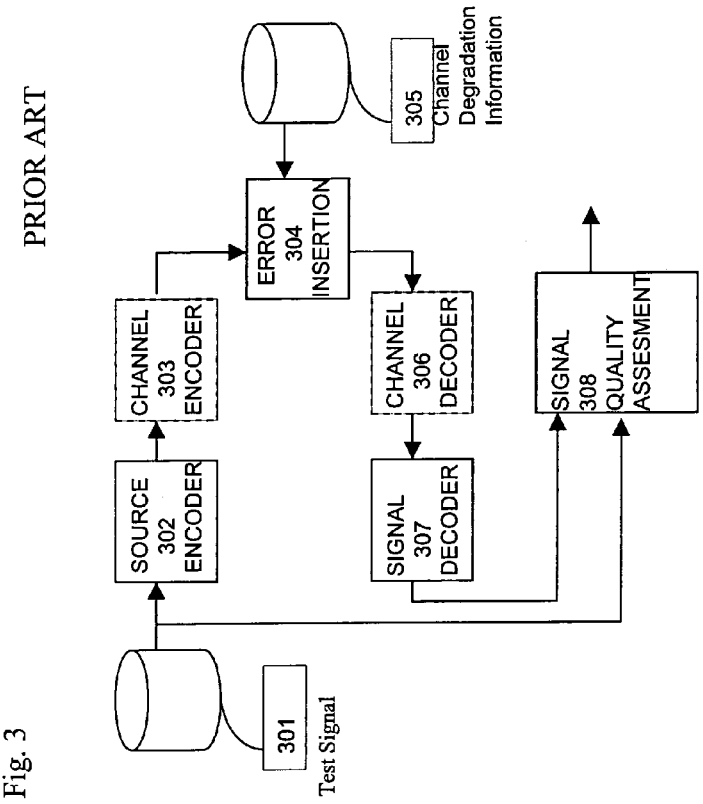
FIG. 3 is a block diagram illustrating apparatus for measuring channel transmission accuracy.

An apparatus for assessment of transmission channel performance is illustrated in FIG. 3. In a first arrangement, channel degradation information in the form of a raw error pattern is used to degrade a reference signal. A test signal 301, which need not be the same as that used to generate the channel degradation information, is passed through a signal encoder 302 and a channel encoder 303. An error insertion device 304 processes the output such that symbols with sequence positions corresponding to those indicated by the channel degradation information are modified. The channel degradation information is stored at 305. The output of the error insertion device 304 is input to a channel decoder 306 and a source decoder 307. Finally, a signal quality assessment algorithm 308, such as but not restricted to that described in European Patent number 0647375, estimates the performance of the channel under test by using the test signal 301 and the output of the source decoder 307 as the reference-degraded signal pair.

It is possible to use this first arrangement to investigate how different signal codecs and channel codecs would perform with the modulator and radio channel used to generate the channel degradation information. This can readily be achieved by changing the signal codec (302 and 307) and channel codec (303 and 306) in FIG. 3.

In a second arrangement, channel degradation information in the form of a residual bit-error pattern is used to degrade a reference signal. A reference and degraded signal pair can be generated from the residual error pattern using processing stages similar to those in FIG. 3, omitting the channel encoder 303 and channel decoder 306. The channel degradation information may, in this case, include information about uncorrected but detected errors which can be used by the signal decoder to conceal the effects of said errors. The second arrangement can be used to investigate how different signal codecs (302 and 307) would perform with the channel codec, modulator and radio channel used to generate the channel degradation information in the form of the residual bit-error pattern.

If the signal encoder produces frames comprising multiple bits, it is important that the residual error pattern is aligned with the frame boundaries of the signal encoder. This is because the channel coder and the channel decoder may apply different levels of error correction to different to bit positions within a frame to take into account variations in error-sensitivity. This alignment is illustrated for three frames in FIG. 2, where bit-sequence 401 is the output of a signal encoder; bit-sequence 402 is an error pattern; and bit-sequence 403 is the output of the error insertion device. A value of '1' in the error pattern indicates that the bit in that position was received in error, and should therefore be inverted.

Figure 4:
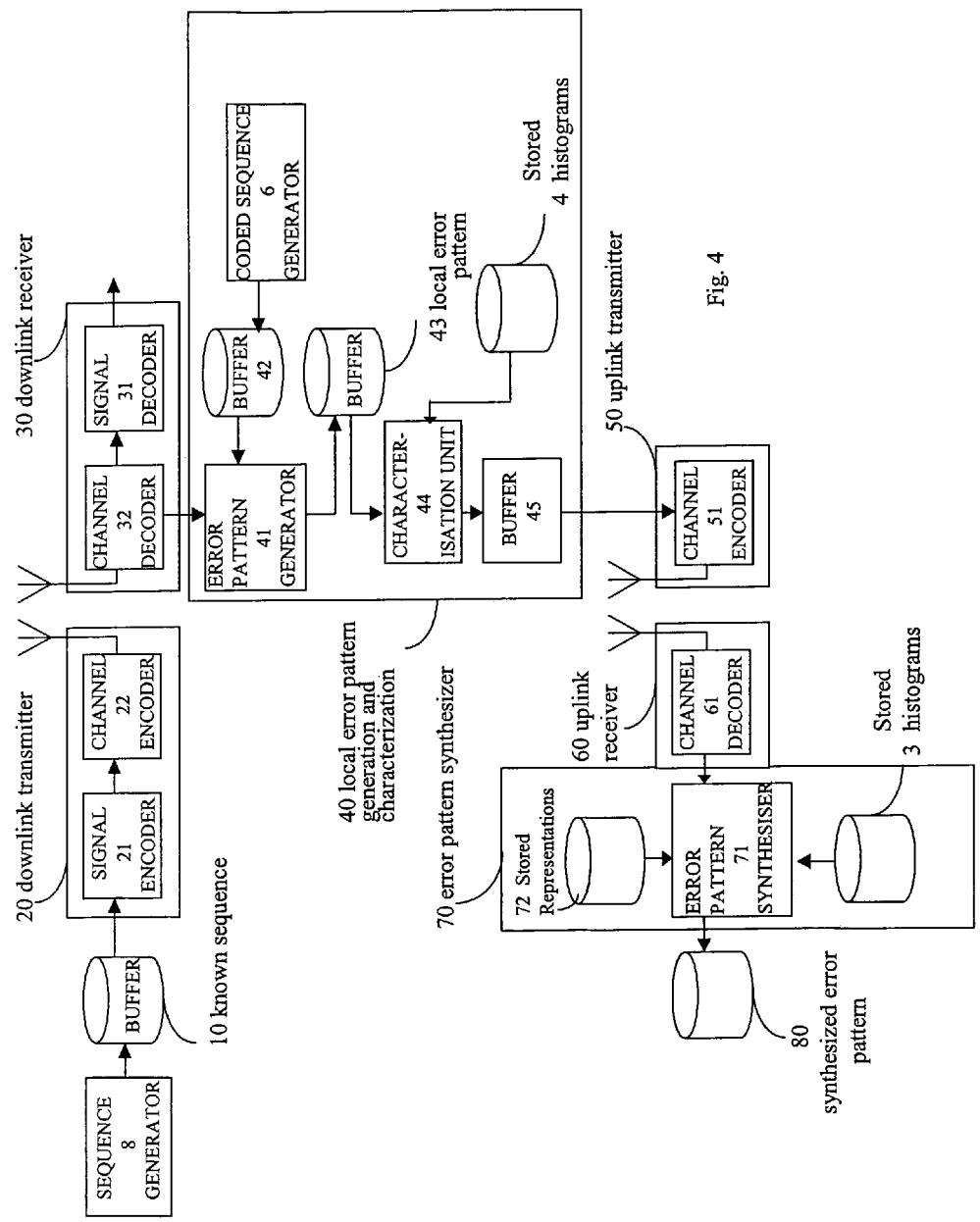
FIG. 4 is a block diagram illustrating an apparatus according to one aspect of the present invention.
Figure 5:
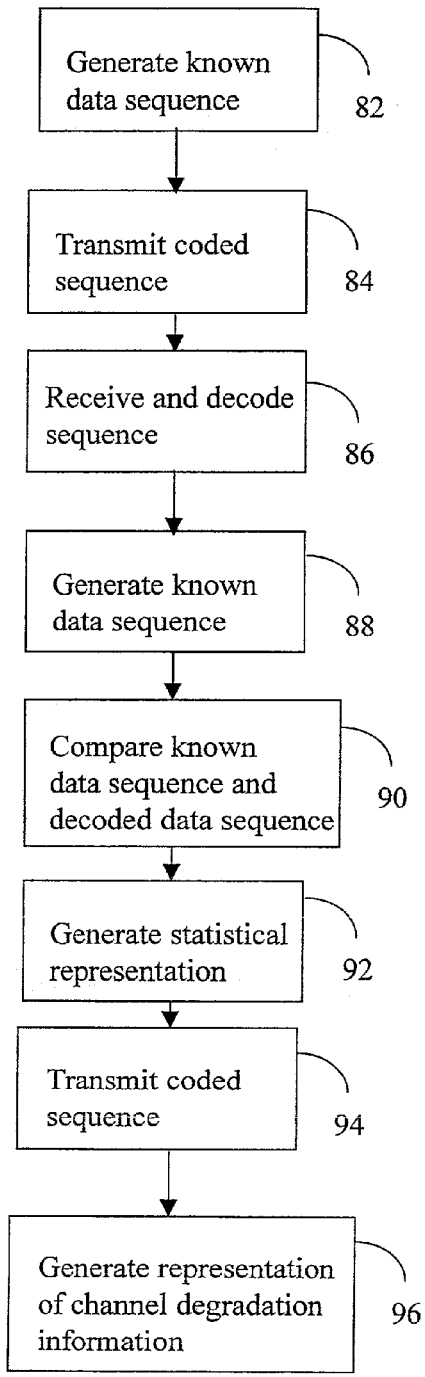
FIG. 5 is a flow diagram illustrating operation of a method according to one aspect of the present invention.

The invention will now be described with reference to FIG. 4 which illustrates an apparatus according to the invention, together with FIG. 5 which illustrates a method according to the present invention.

At step 82 a known data sequence is generated by a data sequence generator 8 and stored in a buffer 10. The known data sequence is coded using a signal encoder 21 and a channel encoder 22 and transmitted at step 84 over a channel under test by a downlink transmitter 20 to a downlink receiver 30. For the purposes of clarity, the transmitter 20 is shown comprising only the signal encoder 21 and the channel encoder 22. The transmitted data sequence is received at step 86 by a downlink receiver 30 and decoded by a channel decoder 32 and a signal decoder 31.

At step 88 a local copy of the known data sequence once it has been signal encoded and channel encoded is generated by a coded sequence generator 6 and stored in a buffer 42. At step 90 an error pattern generator 41 is used to compare the data sequence at the input of the channel decoder 32 with the encoded version of the known data sequence 42 to produce channel degradation information in the form of a raw error pattern which is stored in a buffer 43. At step 92 a statistical representation of the channel degradation information is generated by a characterisation unit 44 and stored in the buffer 43. The characterisation unit 44 counts the number of differences detected between the data sequence at the input of the channel decoder 32 with the encoded version of the known data sequence 42 which are recorded in each frame of the channel degradation information and stores this statistical representation of the channel degradation information in a buffer 45.

The statistical representation is encoded by a channel encoder 51 prior to transmission at step 94 by an uplink transmitter 50. In an uplink receiver 60, a channel decoder 61 extracts the statistical representation from the received signal.

Finally, at step 96, an error pattern synthesiser 70 constructs a representation of the channel degradation information and stores it in a buffer 80.

Each frame of the synthesised error pattern is generated from the received characterisation value by generating the required number of errors in randomly chosen positions within the representation of the channel degradation information. Using the representation of the channel degradation information format illustrated in FIG. 2, this is achieved by the following steps:

1) set all of the positions in the frame to '0';
2) initialize a counter to zero;
3) select a random position in the frame;
4) if the selected position is equal to '0', set it to one and increment the counter; if the selected position is equal to '1', repeat Step 3;
5) compare the counter with the number of desired errors;
6) if the counter is less than the number of desired errors go to Step 3.

In the special case where the number of desired errors is zero, only Step 1 is performed. The selection of the bit error positions in Step 3 may be performed entirely randomly such that all frame positions are equally likely to be selected. Alternatively, if the channel under test has known error characteristics such as burstiness, the position of the bit errors may be calculated using an error generation model.

For example, a two-state Markov model is a well-known method of generating random error bursts; the transition probabilities of the model determining the error characteristics. The channel degradation information synthesised represents a raw error pattern and can be used according to the first arrangement described above, with reference to FIG. 3, to evaluate the transmission performance of the downlink channel under test. The presence of signal and channel codecs is not essential to this embodiment.

In a second embodiment, synthesised channel degradation information is selected from a set of stored representations 72 containing pre-stored channel degradation information with known total numbers of errors. The representation with the number of errors closest to the desired number of errors is selected. Prior to generation of the synthesised channel degradation information, the selected representation is cyclically rotated such that all phase offsets are equally likely, thus ensuring that on average all frame positions in the error pattern are equally likely to be used. This embodiment is useful in systems where errors occur in bursts, because the pre-stored representations in the set can simulate the error burst characteristics of the channel.

In a third embodiment, the characterisation information for channel degradation information represented by a raw error pattern includes information indicating the distribution of soft decision values at the output of the demodulator 205 (FIG. 1). For example, this information may be transmitted for each statistical representation by selecting, from a stored set of histograms 4, the entry best matching the distribution of received soft decision values for the current frame.

The statistical information, in this embodiment, includes an indicator of the selected histogram, and the error pattern synthesiser uses the indicated histogram from a copy of the set of histograms 3 to generate soft decision values with the appropriate frequency of occurrence.

In a further embodiment, a local error pattern 43 is formed by comparing the output of the channel decoder 32 with a local copy 42 of the input of the channel encoder 22. The channel degradation information represents a residual error pattern and can be used according to the second arrangement described above to evaluate the transmission performance of the downlink channel under test.

As previously discussed, groups of bits in an output frame of a signal encoder may be channel encoded with different levels of error protection. Bits receiving the highest level of protection are commonly referred to as 'Class 1 bits'; the bits receiving the next highest level of protection being referred to as 'Class 2 bits', and so on. When used with such a transmission system, the characterization unit 44, counts the number of bit errors in each class of bits in the local error pattern 43. The number of errors in each Class is then transmitted to the error pattern synthesizer 71, which generates a representation of channel degradation information for each class of bits according to the methods described previously.

If the channel decoder 32 produces information pertaining to the presence of detected but uncorrected residual bit errors, for example the result of a cyclic redundancy check (CRC), this information may also be included in the statistical representation transmitted to the error pattern synthesizer 71.

In some cases it may be possible to deduce if errors have been detected but not corrected from the statistical representation, for example, if a powerful CRC check is performed over a complete class of bits.

Figure 6:
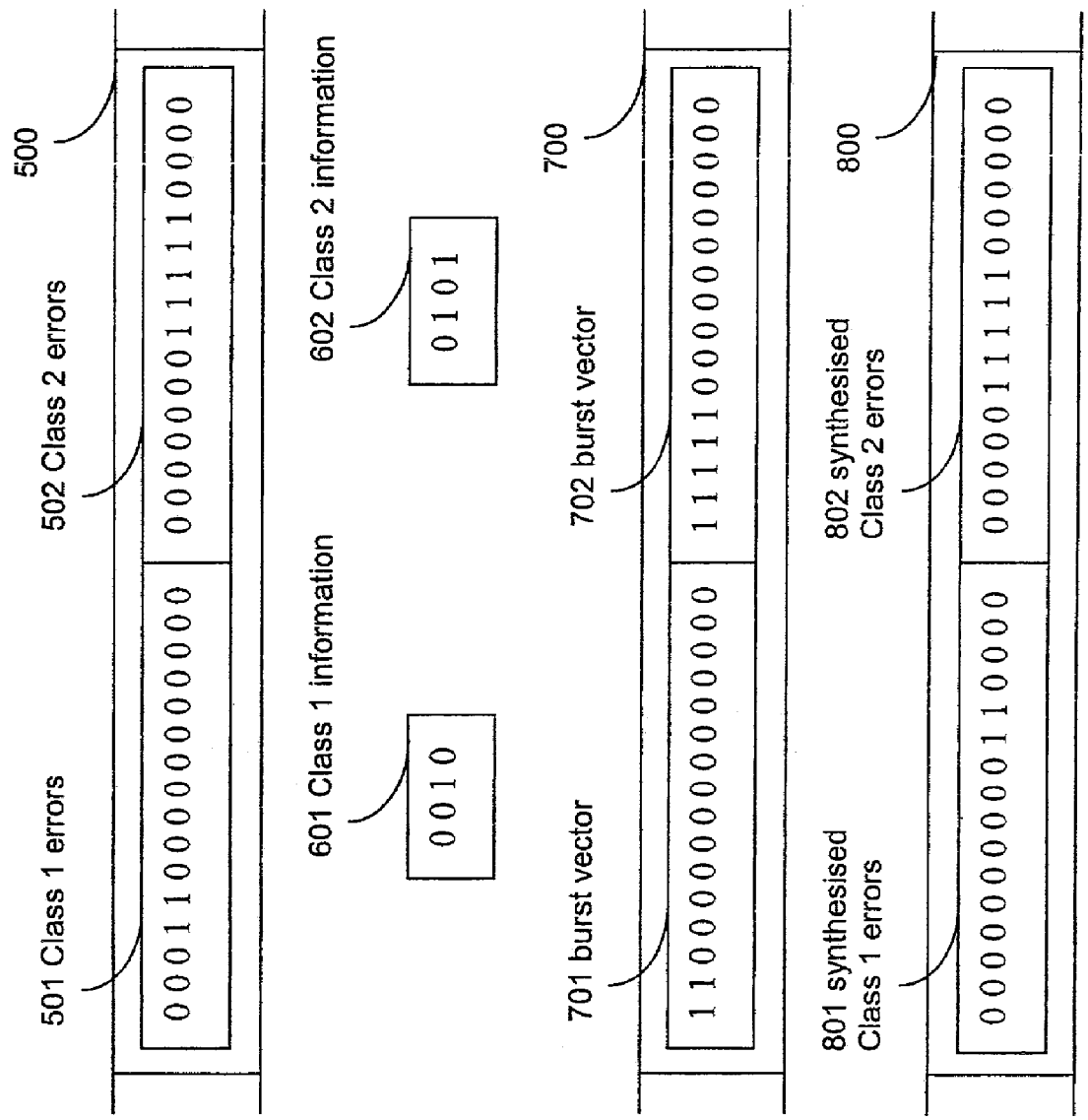
FIG. 6 is an illustration of a statistical representation of one embodiment of the invention.

FIG. 6 illustrates an example of a statistical representation comprising a representation of the number of differences detected for a plurality of sets of bits, each set of bits being encoded at a difference level of error protection.

In this example, the channel encoder applies two levels of error protection, thus the error pattern frame 500 is divided into Class 1 bits 501 and Class 2 bits 502, each containing sixteen bits. The statistical representation comprises two 4-bit values 601 and 602 representing the number of received bit errors in Class 1 and Class 2. Vectors 701 and 702 are the stored representations with the number of errors best matching the statistical representation for each class of bits. The representation of the channel degradation information 800 comprises randomly rotated versions of vectors 801 and 802. In this case the Class 1 vector has been rotated right by 10 bit positions, and the Class 2 vector has been rotated right by 5 bit positions.

The embodiments described above have been described with reference to transmitting information characterising downlink errors over an error protected uplink channel. The invention is equally applicable to the reverse situation—that is where information characterizing uplink errors is transmitted over an error protected downlink channel.

It will be understood by those skilled in the art that the methods described above may be implemented on a conventional programmable computer, and that a computer program encoding instructions for controlling the programmable computer to perform the above methods may be provided on a computer readable medium.

It is to be recognized that various alterations, modifications, and/or additions may be introduced into the constructions and arrangements of parts described above without departing from the spirit or ambit of the present invention.

The invention claimed is:

1. A method of determining a reconstructed representation of channel degradation information for a communication channel, comprising the steps of:
   a) generating a known data sequence within a transmitter;
   b) transmitting a coded data sequence based on the known data sequence via said communication channel;
   c) receiving data received via the communication channel to provide a received data sequence at a receiver;
   d) generating said coded data sequence based on the known data sequence within the receiver;
   e) comparing the coded data sequence generated within the receiver with the received data sequence to provide said channel degradation information;
   f) generating a statistical representation of the channel degradation information;
   g) transmitting the statistical representation to a receiver; and
   h) generating the reconstructed representation of the channel degradation information according to the statistical representation.

2. A method in which a test data sequence is degraded using the reconstructed channel degradation information obtained according to claim 1, further comprising the steps of:
   i) encoding the test data sequence to produce an encoded data sequence;
   j) modifying the encoded data sequence according to said representation of the channel degradation information;
   k) decoding the modified encoded data sequence to produce a decoded data sequence; and
   l) comparing the decoded data sequence to the test data sequence.

3. A method according to claim 2, in which the generation of the reconstructed representation of the channel degradation information comprises selecting the representation of the channel degradation information from a set of stored representations according to the statistical representation.

4. A method according to claim 1, in which the statistical representation of the channel degradation information comprises a representation of the number of differences detected in the comparing step e) for each corresponding pair of frames of the known data sequence and the received data sequence.

5. A method according to claim 4 in which the representation of the number of differences detected comprises a plurality of representations each representation corresponding to the number of differences detected for a set of symbols within a frame, each symbol of the set being encoded at a similar level of error protection.

6. A method according to claim 1, in which the statistical representation of the channel degradation information comprises a representation of a set of statistical values each of which is derived from the probability that a symbol within the received data sequence has been decoded correctly.

7. A computer readable medium carrying a computer program for implementing the method according to claim 1.

8. A computer program for implementing the method according to claim 1.

9. An apparatus for determining a reconstructed representation of channel degradation information for a communication channel comprising:
   a generator arranged to generate a known data sequence;
   a transmitter including a coder and being arranged to transmit a coded data sequence based on the known data sequence;
   a receiver being arranged to receive the transmitted coded data sequence;
   a generator arranged to generate the coded data sequence based on the known data sequence;
   a comparator arranged to compare the coded data sequence based on the known data sequence with the transmitted coded data sequence to provide the channel degradation information;
   a generator arranged to generate a statistical representation of the channel degradation information;
   a transmitter arranged to transmit the statistical representation to a receiver; and
   a generator arranged to generate the reconstructed representation of the channel degradation information in dependence upon said statistical representation.

10. An apparatus for assessment of communication channel accuracy comprising:
    the apparatus for determining the reconstructed representation of channel degradation information for the communication channel according to claim 9;
    an encoder arranged to encode a reference signal;
    a store for storing said reconstructed representation of the channel degradation information;
    an error insertion device arranged to modify the encoded reference signal according to the representation of channel degradation information;
    a decoder arranged to decode the modified encoded reference signal; and
    a comparator arranged to compare the decoded signal and the reference signal.

11. An apparatus according to claim 10 in which the encoder comprises a signal encoder and a channel encoder and the decoder comprises a signal decoder and a channel decoder.

* * * * *